United States Patent [19]
Houde et al.

[11] Patent Number: 5,978,678
[45] Date of Patent: Nov. 2, 1999

[54] CELLULAR TELEPHONE NETWORK ROUTING METHOD AND APPARATUS FOR INTERNATIONALLY ROAMING MOBILE STATIONS

[75] Inventors: Michel Houde; Binh Nguyen, both of St-Laurent, Canada

[73] Assignee: Telefonaktiebolaget L M Ericsson (publ), Stockholm, Sweden

[21] Appl. No.: 08/696,468

[22] Filed: Aug. 14, 1996

Related U.S. Application Data

[60] Provisional application No. 60/019,410, Jun. 7, 1996.

[51] Int. Cl.$^6$ ..................................................... H04Q 7/20
[52] U.S. Cl. ........................... 455/433; 455/432; 455/445
[58] Field of Search ................................. 455/432, 433, 455/435, 461, 522, 445, 422; 379/220

[56] References Cited

U.S. PATENT DOCUMENTS

| | | | |
|---|---|---|---|
| 5,305,372 | 4/1994 | Tomiyori | 455/564 |
| 5,353,340 | 10/1994 | Kunz | 455/432 |
| 5,406,620 | 4/1995 | Pei | 379/220 |
| 5,497,412 | 3/1996 | Lannen et al. | 455/432 |
| 5,610,974 | 3/1997 | Lantto | 455/433 |
| 5,621,783 | 4/1997 | Lantto et al. | 455/433 |
| 5,699,408 | 12/1997 | Krolopp et al. | 455/411 |
| 5,724,658 | 3/1998 | Hasan | 455/433 |
| 5,734,700 | 3/1998 | Hauser et al. | 455/433 |

FOREIGN PATENT DOCUMENTS 0675663 of 0000 European Pat. Off. .

WO 96/20574 7/1996 WIPO .

OTHER PUBLICATIONS

The Mobile Communications Handbook, Jerry D. Gibson; CRC Press in cooperation with IEEE Press; pp. 294–299, 1996.

Yu, "Overview of EIA/TIA IS–41", IEEE International Symposium on Personal, Indoor and Mobile Radio Communications, Boston, Oct. 1992, pp. 220–224.

PCT International Search Report, Dec. 8, 1997, File No. PCT SE 97/00943.

*Primary Examiner*—Dwayne D. Bost
*Assistant Examiner*—Tracy M. Legree
*Attorney, Agent, or Firm*—Jenkens & Gilchrist

[57] ABSTRACT

The registration notification signal sent to the home cellular system when an internationally roaming cellular mobile station registers in a foreign cellular system includes an identification of the currently serving switching node. Upon subsequent receipt of an incoming call dialed to the roaming mobile station home directory number, the home cellular system signals the serving cellular system and a temporary local directory number is assigned and returned to the home cellular system. The switching node identification is then processed to identify the proper international dialing digits for calling the country where the serving switching node is located. The returned temporary local directory number is then appended to the identified international dialing digits to form an international telephone number which is used by the home cellular system to route the received call to the currently serving cellular system for delivery to the called internationally roaming mobile station.

15 Claims, 2 Drawing Sheets

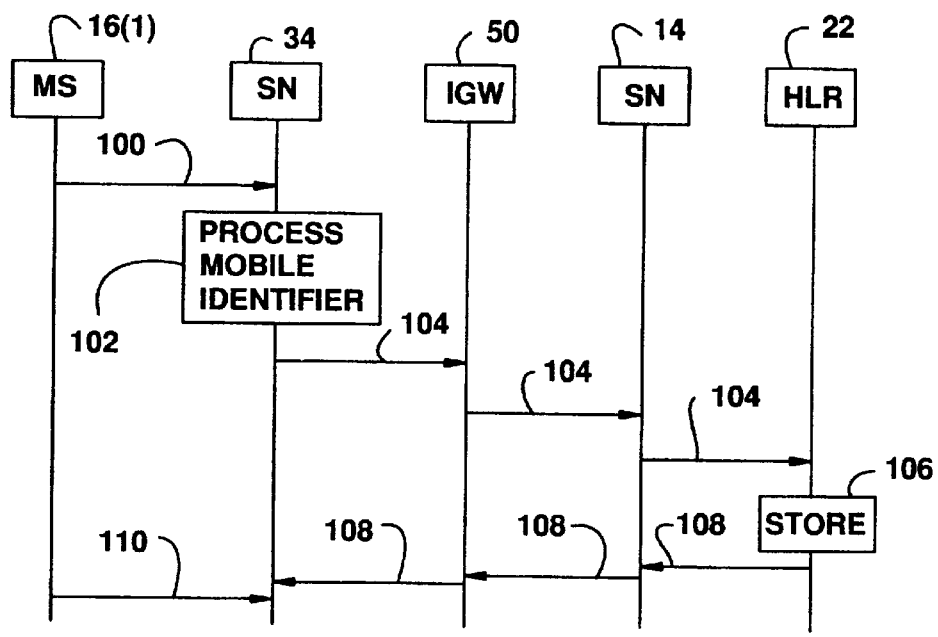
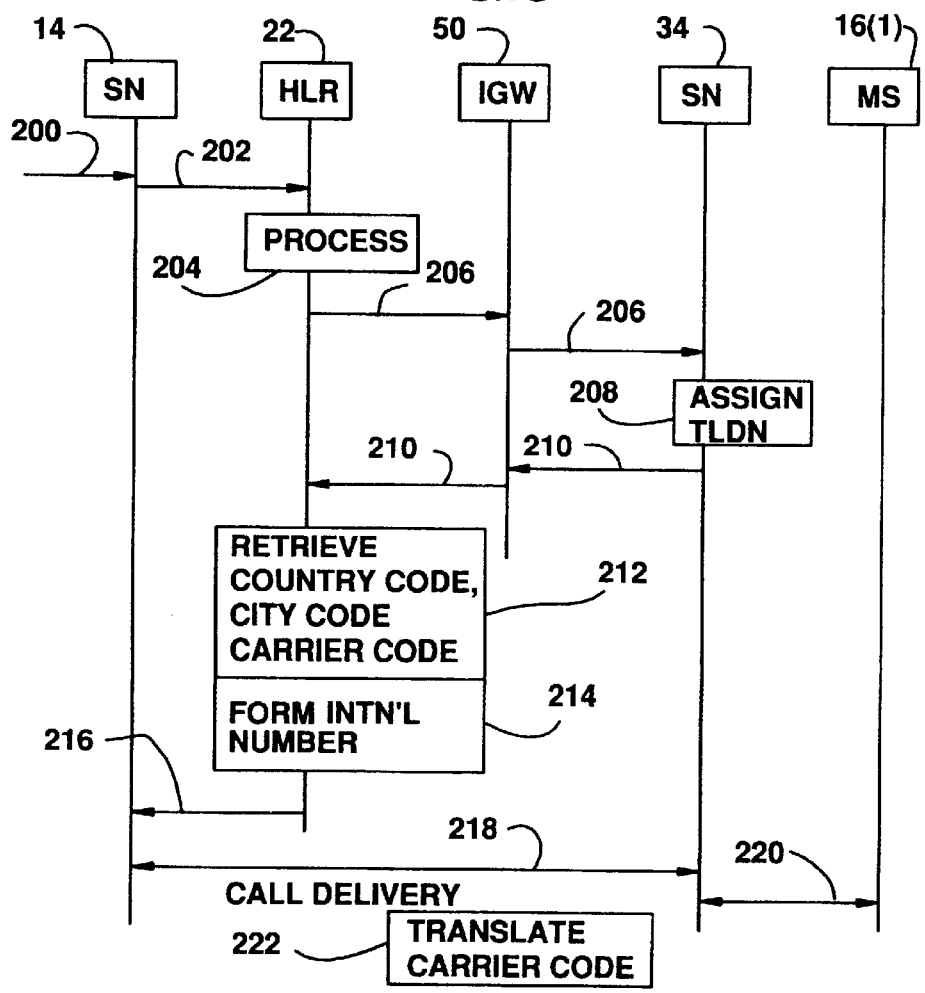

CELLULAR TELEPHONE NETWORK ROUTING METHOD AND APPARATUS FOR INTERNATIONALLY ROAMING MOBILE STATIONS

CROSS-REFERENCE TO RELATED APPLICATION

This application for patent claims priority from previously filed and co-pending U.S. Provisional Application for Pat. Ser. No. 60/019,410, entitled "CELLULAR TELEPHONE NETWORK ROUTING METHOD AND APPARATUS FOR INTERNATIONAL ROAMING MOBILE STATIONS" and filed on Jun. 7, 1996.

BACKGROUND OF THE INVENTION

1. Technical Field of the Invention

The present invention relates to cellular telephone networks and, in particular, to the routing of telephone calls to and from mobile stations engaged in international roaming.

2. Description of Related Art

The mobility benefits provided to subscribers by cellular telephone networks comprise, perhaps, their most important and effective marketing advantage over and technical distinction with respect to conventional wire line telephone service. It is common for subscribers then to use their mobile stations not only in the immediate geographic areas surrounding their homes and businesses, but also to travel outside of their home cellular service area to other cellular service areas. When this occurs, the subscribers and their mobile stations are said to be "roaming".

Within one country, the plural cellular systems scattered throughout that country are generally technically compatible with each other. If the various service providers have billing and other reciprocity service agreements with each other, a cellular subscriber may then roam among and between those service areas and still make and receive telephone calls. The process of registering in the visited system occurs transparently to the subscriber. Even absent an agreement with respect to billing, the overall system technical compatibility allows the subscriber to arrange for a personal billing agreement with the service provider, and thus access the visited cellular system to make and receive telephone calls. With respect to the reception of calls, the subscriber mobile station is reached by dialing its originally (permanently) assigned directory number.

The number of people owning cellular mobile stations has dramatically increased in recent years. Furthermore, an increasing number of geographic locations now have access to a cellular telephone service. With this increase in numbers of users and service availability, there also exists an increasing number of instances where subscribers have the capability, and the desire to engage in, of cellular roaming. In fact, it is now common for persons to take their cellular mobile stations with them on business trips and vacations. Often times these trips and vacations involve travel to a different country.

While technical compatibility with the cellular system in the visited country may be present, it is unlikely that the service provider in the visited system and the subscriber's home service provider have agreed to service provision and billing arrangements with respect to internationally roaming subscribers. The subscriber must accordingly contact the service provider in the visited country and manually register their mobile station for service. Once registered, the subscriber may then make a cellular telephone call. Receiving a cellular telephone call, however, further requires the assignment by the service provider of a temporary directory number to the subscriber's mobile station. A party desiring to call the subscriber may then have to use the assigned temporary directory number rather than the subscriber's home directory number in placing an international call to the subscriber. Accordingly, to be accessible for incoming calls while engaging in international roaming, the subscriber must inform others of the newly assigned temporary number. Inconveniently, this number is valid only for the currently visited cellular system. If the subscriber should thereafter move to another country (or even switch service providers within a single country), or perhaps change to a different switch of the same service provider in the same country, another manual registration must be made and another temporary directory number is assigned for subsequent use.

There is a need then for a more efficient method and system for enabling subscribers to engage in international roaming. Preferably, such a method and system would allow a subscriber to maintain use of their home directory number.

SUMMARY OF THE INVENTION

When an internationally roaming cellular mobile station registers with a switching node of a currently serving foreign cellular system, a registration notification signal is sent from the serving cellular system to the home location register in the home cellular system. This registration notification signal includes an identification of the currently serving switching node which is stored for later use. From processing the transmitted switching node identification number, the home location register recognizes that the mobile station is currently engaged in international roaming and can accordingly handle any subsequently received incoming calls.

When a call is subsequently dialed to the home directory number of that internationally roaming mobile station, the home cellular system processes the previously received switching node identification information and signals the currently serving cellular system with a routing request signal. Responsive thereto, the serving cellular system assigns a temporary local directory number to the roaming mobile station, and returns that number information to the home location register in the home cellular system. The home location register then processes the previously stored switching node identification to identify the proper international dialing digits (including the international access digits, country code and city code, if necessary) for calling the country where the serving switching node is located. The returned temporary local directory number is then appended to the identified international dialing digits to form an international telephone number. The identified international dialing digits may further include the carrier code for the long distance carrier preferred by the subscriber owning the internationally roaming mobile station to handle its long distance calling service. The formed international telephone number is then used by the home cellular system to route the received call to the currently serving cellular system for delivery to the called internationally roaming mobile station.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 is a signal flow and network operation diagram illustrating operation of the network of FIG. 1 in connection with the registration of an internationally roaming mobile station; and FIG. 3 is a signal flow and network operation diagram illustrating operation of the network of FIG. 1 in connection with the delivery of a call to the internationally roaming mobile station.

DETAILED DESCRIPTION OF THE DRAWINGS

Figure 1:
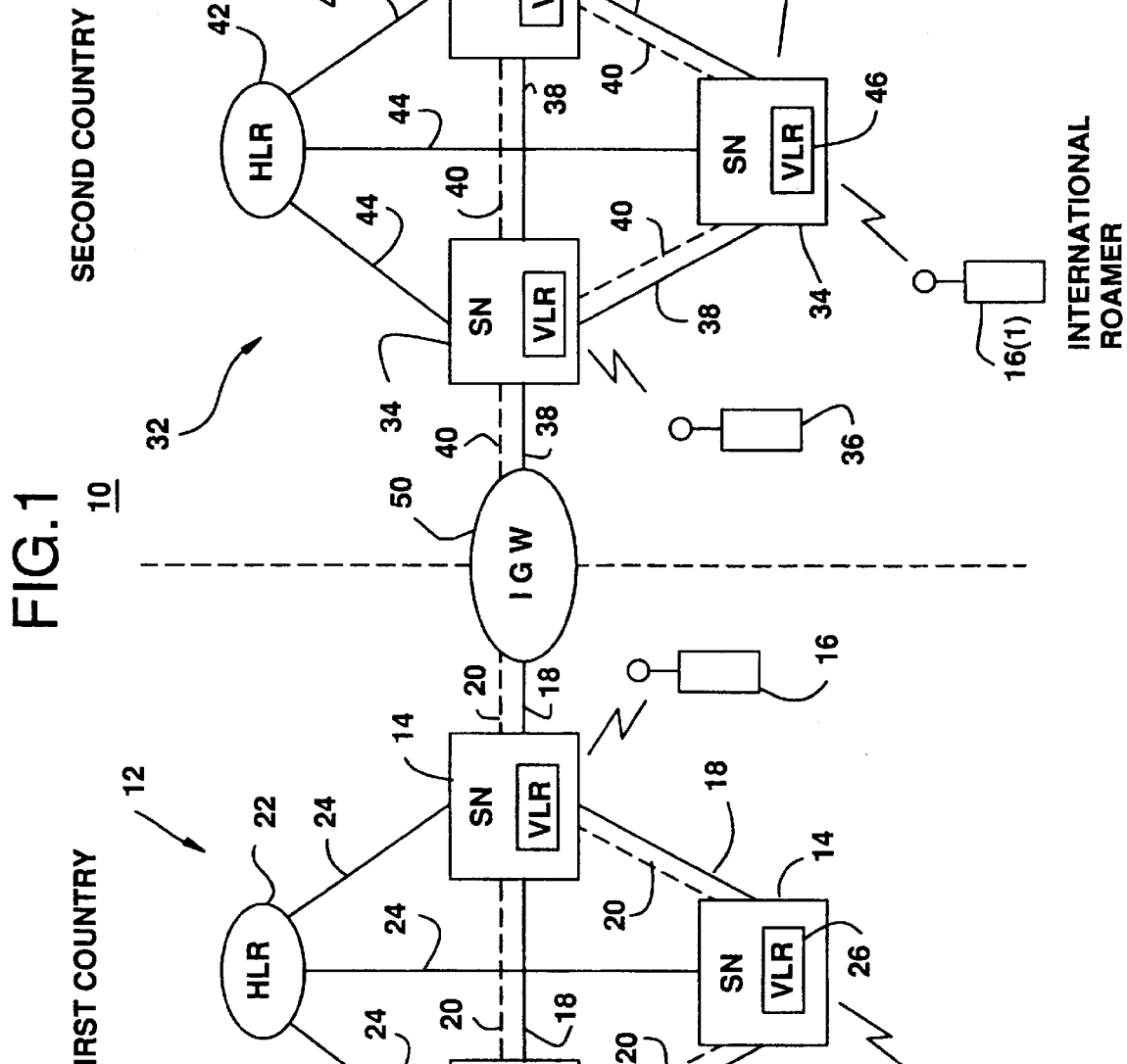
FIG. 1 is a block diagram of an international cellular telephone network.

Reference is now made to FIG. 1 wherein there is shown a block diagram of an international cellular telephone network 10.

A first country cellular network 12 portion of the international network 10 includes a plurality of interconnected switching nodes (SN) 14. Although only three switching nodes 14 are shown, it will be understood that the first country cellular network 12 likely includes many more interconnected nodes. The switching nodes 14 may comprise any one of a number of known telecommunications switching devices, including those commonly used and known in the art for providing either digital or analog cellular telephone service to a plurality of subscriber mobile stations 16. The switching nodes 14 are interconnected for communication via both signaling links 18 (illustrated with solid lines) and voice trunks 20 (illustrated with broken lines). The voice trunks 20 provide voice and data communications paths used to carry subscriber communications between the nodes 14. The signaling links 18 carry command signals between the nodes 14 used for setting up and tearing down voice and data communications links over the voice trunks 20, and for controlling the provision of service features to the subscriber mobile stations 16. The switching nodes 14 are connected to a home location register (HLR) data base 22 by means of signaling links 24. The home location register data base 22 stores information concerning the assigned subscriber mobile stations 16 comprising location information and service information. Each switching node 14 is further connected to a visitor location register (VLR) data base 26 (shown integrated with the switching node as an MSC/VLR) for temporary storage of subscriber information with respect to those subscriber mobile stations 16 currently being served by that switching node.

A second country cellular network 32 portion of the international network 10 includes a plurality of interconnected switching nodes (SN) 34. Although only three switching nodes 34 are shown, it will be understood that the second country cellular network 32 likely includes many more interconnected nodes. The switching nodes 34 may comprise any one of a number of known telecommunications switching devices, including those commonly used and known in the art for providing either digital or analog cellular telephone service to a plurality of subscriber mobile stations 36. The switching nodes 34 are interconnected for communication via both signaling links 38 (illustrated with solid lines) and voice trunks 40 (illustrated with broken lines). The voice trunks 40 provide voice and data communications paths used to carry subscriber communications between the nodes 34. The signaling links 38 carry command signals between the nodes 34 used for setting up and tearing down voice and data communications links over the voice trunks 40, and for controlling the provision of service features to the subscriber mobile stations 36. The switching nodes 34 are connected to a home location register (HLR) data base 42 by means of signaling links 44. The home location register 42 stores information concerning the assigned subscriber mobile stations 36 comprising location information and service information. Each switching node 34 is further connected to a visitor location register (VLR) data base 46 (shown integrated with the switching node as an MSC/VLR) for temporary storage of subscriber information with respect to those subscriber mobile stations 36 currently being served by that switching node.

An international gateway (IGW) 50 is used to connect at least one of the switching nodes 14 of the first country cellular network 12 with at least one of the switching nodes 34 of the second country cellular network 32. The connections involved include a signaling link 18 and voice trunks 20 between the switching node 14 of the first country cellular network 12 and the international gateway 50. Similar signaling link 38 and voice trunk 40 connections are provided between the switching node 34 of the second country cellular network 32 and the international gateway 50.

Instances may occur where a first country cellular network 12 subscriber travels to the second country and wishes to use his or her mobile station 16(1) in the second country cellular network 32. Historically, this required the subscriber to manually register in the second country cellular network 32. Manual registration establishes the billing arrangement for the subscriber to pay for use of and access to the second country cellular network 32, and also assigns to the mobile station 16 a temporary directory number. This assigned temporary directory number, rather than the home directory number for the mobile station 16, may then have to be dialed by a party in either the first or second country when they want to call that internationally roaming subscriber. It would be preferred, however, if contact could be made with the subscriber instead by dialing the home directory number.

Reference is now additionally made to FIG. 2 wherein there is shown a signal flow and network operation diagram illustrating operation of the network 10 of FIG. 1 in connection with the registration of an internationally roaming mobile station 16(1). The internationally roaming mobile station 16(1) sends a registration signal 100 to its selected serving switching node 34 in the second country cellular network 32. This registration signal includes an identifier of the mobile station 16(1) comprising, for example, its mobile identification number (MIN), electronic serial number (ESN), international mobile station identifier (IMSI), and/or its temporary mobile station identifier (TMSI). The serving switching node 34 processes (action 102) the mobile station identifier to identify the home location register 22 in the first country cellular network 12 to which that internationally roaming mobile station 16(1) belongs (i.e, is assigned). The serving switching node 34 then sends a registration notification signal 104 (over the signaling links 38, through the international gateway 50, and over the signaling links 18 and 24) for delivery to the home location register 22. This registration notification signal 104 may comprise an IS-41 REGNOT signal or other equivalent standardized or proprietary message, and includes an identification number (i.e., MSCID) for the serving switching node (mobile switching center). The home location register 22 then stores (action 106) the switching node identification number for the currently serving switching node 34 in the subscriber profile for the internationally roaming mobile station 16(1). The data base of the home location register 22 includes information identifying that the switching node identification number is assigned to a switching node 34 located in the second country cellular network 32, and that its subscriber is currently engaged in international roaming. Responsive to receipt of the registration notification signal 104, a service profile 108 for the registering mobile station 16(1) is returned from the home location register 22 to the serving switching node 34 (for storage in its associated visitor location register). Once registered, the mobile station 16(1) may originate calls 110 to cellular or wire line subscribers either within the current country, or to other countries.

Reference is now additionally made to FIG. 3 wherein there is shown a signal flow and network operation diagram illustrating operation of the network 10 of FIG. 1 in connection with the delivery of a call to the internationally roaming mobile station 16(1). A call 200 dialed to the home directory number of the internationally roaming mobile station 16(1) originates from another cellular subscriber or the public switched telephone network (PSTN) and is received at one of the switching nodes 14 (i.e., gateway node) of the first country cellular network 12. It will be noted that the number dialed comprises the originally assigned home directory number. Using the signaling link 24, the switching node 14 interrogates the home location register 22 with a location request signal 202 including the dialed home directory number. This location request signal 202 may comprise an IS-41 LOCREQ signal or other equivalent standardized or proprietary message. The home location register 22 processes (action 204) the location request signal, in view of the previously received registration notification signal 104, to determine the location (i.e., serving switching node 34 within the second country cellular network 32) of the called mobile station 16(1). The home location register 22 then signals the serving switching node 34 for the called mobile station 16(1) (over signaling links 18 and 24, through international gateway 50, and over signaling link 40) with a routing request signal 206 to route the call. This routing request signal may comprise an IS-41 ROUTEREQ signal or other equivalent standardized or proprietary message. Responsive to the signal 206, the serving switching node 34 assigns (action 208) a temporary local directory number (TLDN) to the international roaming mobile station 16(1), and sends a routing request return result signal 210 including the assigned temporary local directory number to the home location register 22 via the international gateway 50. From processing of the previously stored switching node identification for switching node 34, the home location register identifies the country where that node (34) is located and retrieves (action 212) its country code (CC) designation. The country code and returned temporary local directory number are then appended to the proper international dialing access digits (IDAD) to form (action 214) the international number for contacting the called international roaming mobile station 16(1). It will be noted that if the returned temporary local directory number does not include a city code, this may also be determined from processing the switching node identification number and then appended by action 214 at the proper location to complete the international number. It will further be noted that the subscriber owning the international roaming mobile station 16(1) may further have a long distance carrier preference, and in such instances the carrier code for that preferred carrier is also appended by action 214 at the proper location to complete the international number. The home location register 22 then sends a location request return result signal 216 including the formed international number to the gateway switching node 14. The gateway switching node 14 uses the formed international number to deliver (through connects) 218 the incoming call 200 over the voice trunks 20 and 40, and through the international gateway 50, to the serving switching node 34. The call delivery is routed to the international gateway 50 in accordance with the designated carrier code. Using the link between the temporary local directory number and the mobile identification number/electronic serial number of the internationally roaming mobile station 16(1), the switching node 34 signals the mobile station, establishes a call connection 220 and completes call delivery. Furthermore, the included carrier code may be translated (action 222) by the international gateway 50 to designate a particular long distance carrier for use in routing the call from the international gateway to the switching node 34.

The foregoing may be better understood through reference to the following example. Assume that the first country is Canada, and the second country is France. When the internationally roaming mobile station 16(1) registers in the French cellular network 32, its mobile station identifier is processed to identify that the mobile station belongs (i.e., is assigned) to home location register 22 in the Canadian cellular network 12. The identification number for the serving switching node 34 is sent to the home location register 22 for storage in the roaming mobile station's service information. The service profile for the roaming mobile station 16(1) is also returned to the serving switching node 34.

Now assume that a call is received at a gateway switching node 14 of the Canadian cellular network 12 dialed to the home directory number of mobile station 16(1). The home location register 22 is interrogated with the location request signal 202, which is processed to determine mobile station location associated with serving switching node 34 in the French cellular network 32. A routing request signal 206 is then sent by the home location register 22 to the serving switching node 34 to route the call. Responsive thereto, the home location register 22 is informed of the temporary local directory number which has been assigned to the internationally roaming mobile station 16(1). The previously stored switching node identification is then processed to identify the country of France and the French country code (CC=33) designation. The country code and returned temporary local directory number are then appended to the proper international dialing access digits (IDAD=011) to form the international number (011-33-TLDN) for contacting the called internationally roaming mobile station 16(1). In instances where the returned temporary local directory number does not include the city code, the stored switching node identification is then further processed to identify the city code (City) in France for the switching node 34, and that code is added to the formed international number (011-33-City-TLDN). Furthermore, where the subscriber owning the mobile station 16(1) has specified a particular long distance carrier, the carrier code (Carrier) for that carrier is retrieved from the home location register 22 and added to the formed international number (011-Carrier-33-TLDN). Using the formed international number, the gateway switching node 14 delivers (through connects) the incoming call to the serving switching node 34 for delivery to the internationally roaming mobile station 16(1). This through connection recognizes the designated carrier code for call routing to the international gateway 50, and a translation of that code for call routing to the serving switching node 34.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for delivering a call to an internationally roaming mobile station, comprising the steps of:

storing in connection with a prior registration of the internationally roaming mobile station an identification of a switching node in a visited cellular system that is currently serving the internationally roaming mobile station, the identification being stored in a home location register for the internationally roaming mobile station in a home cellular system;

responsive to home cellular system receipt of an incoming call dialed to a home directory number for the internationally roaming mobile station, processing the home location register stored switching node identification by the home cellular system to identify the currently serving switching node location;

transmitting a routing request signal from the home cellular system through an international gateway to the identified currently serving switching node in the visited cellular system;

responsive to the currently serving switching node's receipt of the routing request signal, assigning a temporary local directory number to the internationally roaming mobile station;

transmitting the assigned temporary local directory number from the visited cellular system back through the international gateway to the home location register of the home cellular system;

processing of the stored switching node identification in the home location register of the home cellular system to identify international dialing digits for calling the country where the currently serving switching node is located;

appending the received temporary local directory number to the identified international dialing digits to form an international telephone number; and using the international telephone number to route the incoming call from the home cellular system through the international gateway to the currently serving switching node in the visited cellular system for delivery to the called internationally roaming mobile station.

2. The method as in claim 1 further including the step of storing for the internationally roaming mobile station an identification of a called party preferred long distance carrier.

3. The method as in claim 2 where the step of using further includes the step of routing the incoming call through a particular international gateway using the identified called party preferred long distance carrier.

4. The method as in claim 3 further including the step of translating the identified preferred long distance carrier and wherein the step of routing further includes the step of routing the incoming call through to the currently serving switching node using the translated preferred long distance carrier.

5. The method as in claim 6 wherein the switching node identification comprises a mobile switching center identifier.

6. The method as in claim 1 wherein the international dialing digits comprise:

international access dialing digits; and country code for the country within which the currently serving switching node is located.

7. The method as in claim 6 wherein the international dialing digits further comprise a carrier code for a long distance carrier preferred for use in calling the internationally roaming mobile station.

8. The method as in claim 7 wherein the step of using further includes the step of routing the incoming call through a particular international gateway using the long distance carrier identified by the carrier code portion of the international dialing digits.

9. The method as in claim 8 further including the step of translating the identified preferred long distance carrier and wherein the step of routing further includes the step of routing the incoming call through to the currently serving switching node using the translated preferred long distance carrier.

10. The method as in claim 6 wherein the international dialing digits further comprise a city code for the city within which the currently serving switching node is located.

11. A home location register supporting delivery of incoming calls to assigned mobile stations currently engaged in international roaming, comprising:

means for storing an identification of a switching node currently serving each internationally roaming mobile station assigned to the home location register;

means responsive to an incoming call dialed to a home directory number of a certain internationally roaming mobile station for transmitting an international routing request to the currently serving switching node; and means responsive to receipt of a temporary local directory number assigned by the currently serving switching node to that certain internationally roaming mobile station for:

processing the stored identification of the currently serving switching node to identify international dialing digits for calling the country where the currently serving switching node is located; and appending the received temporary local directory number to the identified international dialing digits to form an international telephone number useful in internationally routing the incoming call to the currently serving switching node.

12. The method as in claim 11 wherein the international dialing digits comprise:

international access dialing digits; and a country code for the country within which the currently serving switching node is located.

13. The home location register as in claim 12 wherein the international dialing digits further comprise a carrier code for a long distance carrier preferred for use in calling the certain internationally roaming mobile station.

14. The method as in claim 12 wherein the international dialing digits further comprise a city code for the city within which the currently serving switching node is located.

15. The home location register as in claim 11 wherein the switching node identification comprises a mobile switching center identifier.

* * * * *